(12) United States Patent
Hsiao et al.

(10) Patent No.: US 6,987,646 B2
(45) Date of Patent: Jan. 17, 2006

(54) METHOD OF MAKING MAGNETIC HEAD HAVING NARROW POLE TIP AND FINE PITCH COIL

(75) Inventors: Richard Hsiao, San Jose, CA (US); Hugo Alberto Emilio Santini, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 82 days.

(21) Appl. No.: 10/632,729

(22) Filed: Jul. 31, 2003

(65) Prior Publication Data

US 2004/0070875 A1 Apr. 15, 2004

Related U.S. Application Data

(62) Division of application No. 09/884,574, filed on Jun. 18, 2001, now Pat. No. 6,741,422.

(51) Int. Cl.
*G11B 5/127* (2006.01)

(52) U.S. Cl. ...................................... 360/126; 360/125

(58) Field of Classification Search ................ 360/125, 360/126, 317; 29/603.15; 204/192.34, 192.35, 204/192.37
See application file for complete search history.

(56) References Cited

U.S. PATENT DOCUMENTS

| | | | |
|---|---|---|---|
| 4,872,079 A | 10/1989 | Roberts | 360/126 |
| 5,512,394 A | 4/1996 | Levenson et al. | 430/5 |
| 5,665,251 A | 9/1997 | Robertson et al. | 216/22 |
| 5,726,841 A | 3/1998 | Tong et al. | 360/122 |
| 5,802,700 A | 9/1998 | Chen et al. | 29/603.14 |
| 5,874,010 A | 2/1999 | Tao et al. | 216/22 |
| 5,926,350 A | 7/1999 | Chiu et al. | 360/121 |
| 6,032,353 A | 3/2000 | Hiner et al. | 29/603.14 |
| 6,198,597 B1 | 3/2001 | Tateyama et al. | 360/126 |
| 6,204,997 B1 | 3/2001 | Sasaki | 360/123 |
| 6,532,647 B1 * | 3/2003 | Maekawa et al. | 29/603.13 |
| 6,622,371 B2 * | 9/2003 | Sasaki | 29/603.14 |
| 6,687,096 B2 * | 2/2004 | Sasaki et al. | 360/317 |
| 6,712,984 B2 * | 3/2004 | Sasaki | 216/22 |
| 6,741,422 B2 * | 5/2004 | Hsiao et al. | 360/126 |
| 6,819,527 B1 * | 11/2004 | Dill et al. | 360/123 |
| 2001/0000303 A1 | 4/2001 | Sasaki | |

* cited by examiner

*Primary Examiner*—William J Klimowicz
(74) *Attorney, Agent, or Firm*—Robert O. Guillot; Intellectual Property Law Offices

(57) ABSTRACT

Following the deposition of an insulation layer, a patterned P2 pole tip seed layer is deposited. Significantly, the pole tip seed layer is not deposited beneath the induction coil area of the magnetic head. A dielectric layer is next deposited and a patterned RIE etching mask that includes both a P2 pole tip trench opening and an induction coil trench opening is fabricated upon the dielectric layer. Thereafter, in a single RIE etching step, the P2 pole tip trench is etched through the dielectric material down to the seed layer, and the induction coil trench is etched through the dielectric material down to the insulation layer. The P2 pole tip is first electroplated up into its trench, an induction coil seed layer is next deposited, and the induction coil is then electroplated up into the induction coil trench.

9 Claims, 4 Drawing Sheets

METHOD OF MAKING MAGNETIC HEAD HAVING NARROW POLE TIP AND FINE PITCH COIL

This is a division of application Ser. No. 09/884,574, filed Jun. 18, 2001, now U.S. Pat. No. 6,741,422.

BACKGROUND OF THE INVENTION

1. Field of the Invention

The present invention relates generally to the fabrication of magnetic heads for hard disk drives, and more particularly to the fabrication of a narrow P2 pole tip and a fine pitch induction coil using a single image transfer step.

2. Description of the Prior Art

Efforts to increase the performance characteristics of hard disk drives have focused on increasing the areal data storage density of the magnetic hard disks and increasing the data writing rate of magnetic heads in writing data to the hard disks. As will be understood from reading this detailed description, the present invention advantageously affects both of these hard disk performance characteristics.

One way to increase the areal data storage density is to decrease the width of the data tracks upon the hard disk media. Narrower data tracks allow for more tracks per inch (TPI) to be written on a disk, thereby increasing the areal data storage density of the disk. The well recognized method for decreasing the width of the data tracks is to decrease the width of the P2 pole tip of the magnetic head, because the width of the P2 pole tip generally determines the width of the data track that is written by the magnetic head. Prior art photolithographic techniques for fabricating P2 pole tips are currently reaching the limits of process accuracy, in that it is difficult to accurately and reliably fabricate high aspect ratio P2 pole tip trenches utilizing photolithographic techniques. Recently, high aspect ratio P2 pole tip trenches have been fabricated utilizing reactive ion etch (RIE) techniques, which have produced good results where the P2 pole tip is subsequently electroplated into the RIE created trench. The present invention is an improvement in the RIE P2 pole tip fabrication process for the fabrication of magnetic heads, as is discussed in detail below.

To improve the magnetic head data writing rate, prior art magnetic heads have been fabricated with higher aspect ratio induction coils. Such high aspect ratio induction coils allow for the individual induction coil turns to be spaced closer together, creating a fine pitch induction coil. Where a fine pitch induction coil is fabricated, the P2 pole yoke can be shortened, thus creating a similarly shortened magnetic flux circuit through the P1 and P2 poles, such that the data writing rate of the magnetic head is increased.

The present invention advantageously utilizes one dielectric layer, one RIE mask and image transfer step, and one RIE step to create both a narrow, high aspect ratio P2 pole tip and a high aspect ratio, fine pitch induction coil. In so doing, fabrication problems associated with separate RIE processes for creating a P2 pole tip and for creating a fine pitch induction coil are avoided, and the fabrication of an improved magnetic head is simplified.

SUMMARY OF THE INVENTION

The magnetic head of the present invention includes a narrow, high aspect ratio P2 pole tip and a high aspect ratio, fine pitch induction coil. Electroplating trenches for the P2 pole tip and the induction coil are fabricated in a single RIE process step, and the P2 pole tip and the induction coil are thereafter separately plated up into their respective trenches to complete the fabrication of these structures.

Briefly, following the fabrication of a P1 pole and the deposition of an insulation layer thereon, a patterned P2 pole tip seed layer is deposited. Significantly, the pole tip seed layer is not deposited beneath the induction coil area of the magnetic head. A dielectric layer is next deposited and a patterned RIE etching mask is fabricated upon the dielectric layer. The etching mask pattern includes both a P2 pole tip trench opening and an induction coil trench opening. Thereafter, in a single RIE etching step, the P2 pole tip trench is etched through the dielectric material down to the seed layer, and the induction coil trench is etched through the dielectric material down to the insulation layer. The P2 pole tip is then electroplated up into its trench, and no electroplating occurs within the induction coil trench because no seed layer has been yet deposited therein. Following the electroplating of the P2 pole tip, an induction coil seed layer is deposited upon the wafer surface and specifically down into the induction coil trench. Thereafter, the induction coil is electroplated up into the induction coil trench. A chemical mechanical polishing (CMP) step is next conducted to remove the excess induction coil material and the RIE etching mask. Thereafter, a patterned insulation layer is deposited upon the induction coil, which is followed by the fabrication of a P2 pole yoke thereupon. Further fabrication steps as are known to those skilled in the art are thereafter accomplished to complete the magnetic head of the present invention.

It is an advantage of the magnetic head of the present invention that it includes a narrow, high aspect ratio P2 pole tip and a high aspect ratio, fine pitch induction coil.

It is another advantage of the magnetic head of the present invention that the P2 pole tip and the induction coil are fabricated utilizing a single RIE etching mask.

It is a further advantage of the magnetic head of the present invention that it includes a narrow, high aspect ratio P2 pole tip and a high aspect ratio, fine pitch induction coil that are fabricated in a single dielectric layer.

It is an advantage of the hard disk drive of the present invention that it has an increased areal data storage density and an increased data writing rate.

It is another advantage of the hard disk drive of the present invention that it includes a magnetic head of the present invention having a narrow, high aspect ratio P2 pole tip and a high aspect ratio, fine pitch induction coil.

It is another advantage of the hard disk drive of the present invention that it includes a magnetic head of the present invention wherein the P2 pole tip and the induction coil are fabricated utilizing a single RIE etching mask.

It is a further advantage of the hard disk drive of the present invention that it includes a magnetic head of the present invention that includes a narrow, high aspect ratio P2 pole tip and a high aspect ratio, fine pitch induction coil that are fabricated in a single dielectric layer.

It is an advantage of the fabrication method of the present invention that a narrow, high aspect ratio P2 pole tip and a high aspect ratio, fine pitch induction coil are fabricated within a single dielectric material layer.

It is another advantage of the method for fabricating a magnetic head of the present invention that the P2 pole tip trench and the induction coil trench are fabricated in a single RIE etching step.

These and other features and advantages of the present invention will no doubt become apparent to those skilled in the art upon reading the following detailed description which makes reference to the several figures of the drawings.

IN THE DRAWINGS

DETAILED DESCRIPTION OF THE PREFERRED EMBODIMENTS

Figure 1:
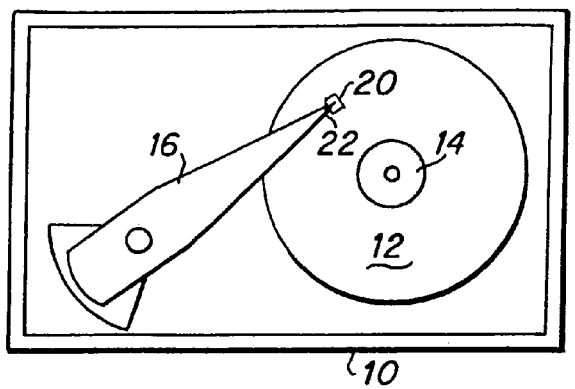
FIG. 1 is a top plan view of a hard disk drive including a magnetic head of the present invention.

FIG. 1 is a top plan view that depicts significant components of a hard disk drive which includes the magnetic head of the present invention. The hard disk drive 10 includes a magnetic media hard disk 12 that is rotatably mounted upon a motorized spindle 14. An actuator arm 16 is pivotally mounted within the hard disk drive 10 with a magnetic head 20 of the present invention disposed upon a distal end 22 of the actuator arm 16. A typical hard disk drive 10 may include a plurality of disks 12 that are rotatably mounted upon the spindle 14 and a plurality of actuator arms 16 having a magnetic head 20 mounted upon the distal end 22 of the actuator arms. As is well known to those skilled in the art, when the hard disk drive 10 is operated, the hard disk 12 rotates upon the spindle 14 and the magnetic head 20 acts as an air bearing slider that is adapted for flying above the surface of the rotating disk. The slider includes a substrate base upon which the various structures that form the magnetic head are fabricated. Such heads are fabricated in large quantities upon a wafer substrate and subsequently sliced into discrete magnetic heads 20.

As is well known to those skilled in the art typical magnetic head fabrication steps generally include the deposition and patterning of various thin film layers to fabricate a read head, followed by the further deposition and patterning of various thin film layers upon the read head to fabricate a write head. The present invention relates to the fabrication of a write head, and therefore a magnetic head of the present invention may include most, if not all, of the various read head configurations as are generally known to those skilled in the art. Therefore, the description of the present invention commences with write head fabrication steps upon a wafer after the fabrication of the read head component layers.

Figure 2:
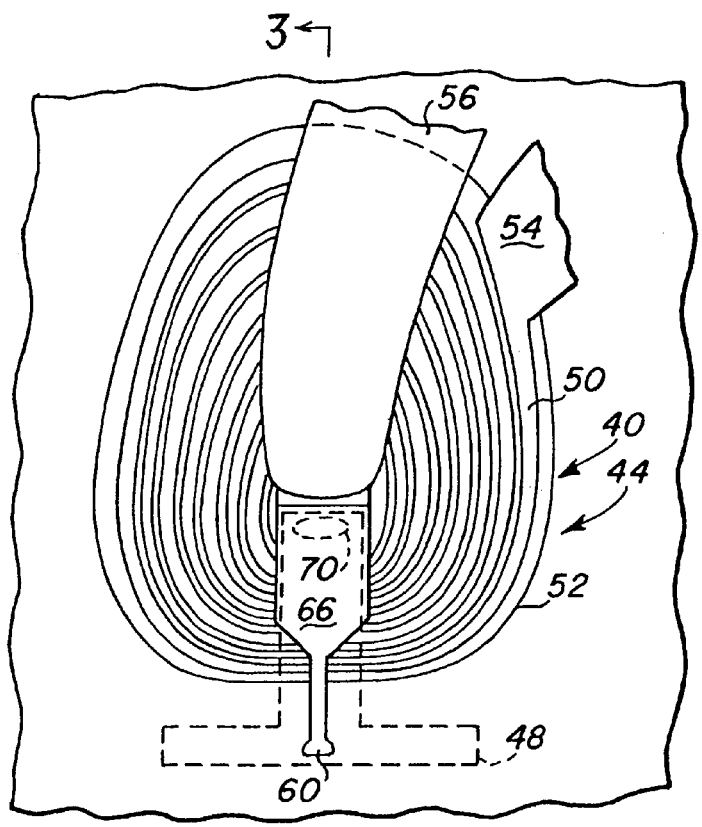
FIG. 2 is a top plan view generally depicting a magnetic head fabricated on a wafer which serves as a starting point for the description of the present invention.

FIG. 2 is a generalized top plan view of a typical magnetic head 40 that serves as an orientation figure for this detailed description. As depicted in FIG. 2, a typical write head portion 44 of a magnetic head generally includes a P1 pole layer 48 that is composed of a ferromagnetic material such as NiFe, a flat, spiral induction coil 50 that is formed in a generally oval area 52 above the P1 pole and includes electrical leads 54 and 56, a narrow P2 pole tip 60 that is formed above portions of the P1 pole, and a P2 pole yoke 66 that is joined to the P2 pole tip 60 and is generally formed above the induction coil. The top of the P2 yoke 66 and the P1 pole 48 are joined together in a back gap area 70 that is generally centrally located within the induction coil area 52, and the P2 pole tip 60 is separated from the P1 pole 48 by a write gap layer (not shown in FIG. 2). These general features of a typical write head portion of a magnetic head 40 are found in the present invention are more fully described in the following detailed description of the present invention which focuses on the fabrication of the P2 pole tip 60 and the induction coil 50.

Figure 3:
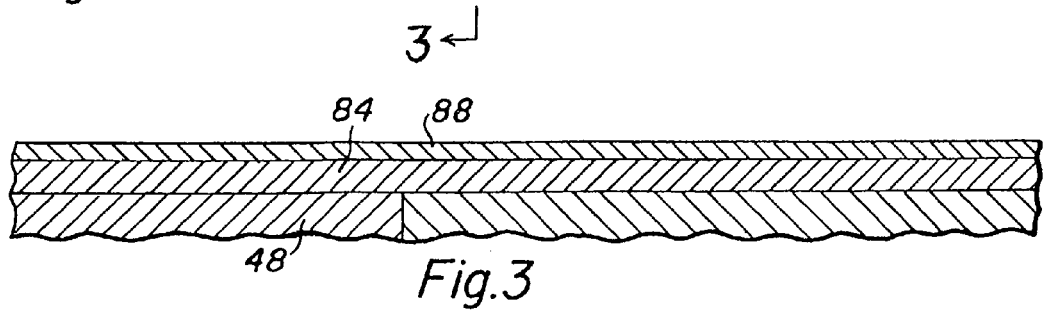
FIGS. 3–7 are side cross-sectional views taken along lines 3—3 of FIG. 2 that depicts further fabrication steps of the magnetic head of the present invention.
Figure 4:
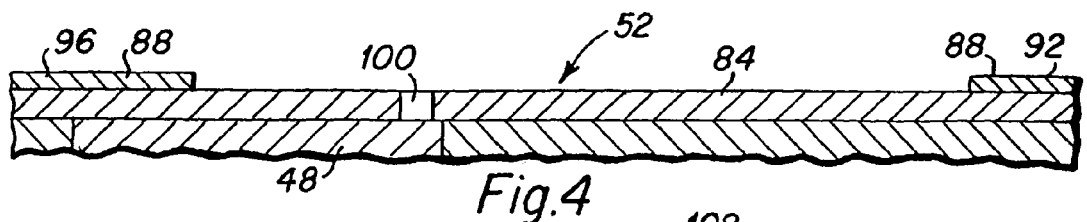
Figure 5:
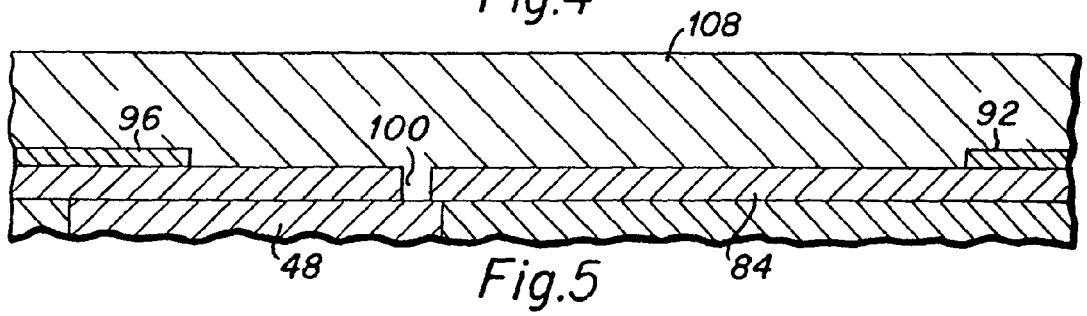

FIG. 3 is a side cross-sectional view of a fabrication step of a magnetic head 20 of the present invention which serves as a starting point for the detailed description, and FIG. 3 is taken along lines 3—3 of FIG. 2. In this initial fabrication step depicted in FIG. 3, the P1 pole 48 has been fabricated and a write gap layer 84 has been deposited upon the P1 pole. A typical write gap layer 84 is composed of an electrically and magnetically nonconductive material, such as alumina. Thereafter, a P2 pole tip magnetic seed layer 88 of the present invention is deposited upon the write gap layer 84. Typically, the P2 pole tip seed layer is comprised of NiFe and serves as an initial electrical plating surface in a subsequent P2 pole tip electroplating process described herebelow. Thereafter, as depicted in FIG. 4 portions of the NiFe seed layer are removed in a patterning step from the area 52 in which the induction coils will subsequently be fabricated. As depicted in FIG. 4 portions 92 of the NiFe seed layer 88 may remain in the field away from the induction coil region. As a result of the seed layer patterning step, the alumina surface is exposed in the coil region 52, whereas a portion of the seed layer 96 remains in the P2 pole tip region. Thereafter, as depicted in FIG. 4, a further patterning and etching step is conducted to create a back gap hole 100 in the exposed write gap layer 84 within the induction coil area 52 to expose the surface of the P1 pole 48, such that a later fabricated back gap element will make magnetic connection with the P1 pole 48, as described in detail herebelow. Thereafter, as depicted in FIG. 5, a layer of dielectric material 108 is deposited across the surface of the wafer and down into the back gap hole 100. It is important that the material comprising the dielectric layer be susceptible to a reactive ion etch process (as described below) and suitable dielectric materials include $SiO_2$ where a fluorine RIE process is conducted, or an organic polymer may be used where an oxygen RIE process is conducted.

Figure 6:
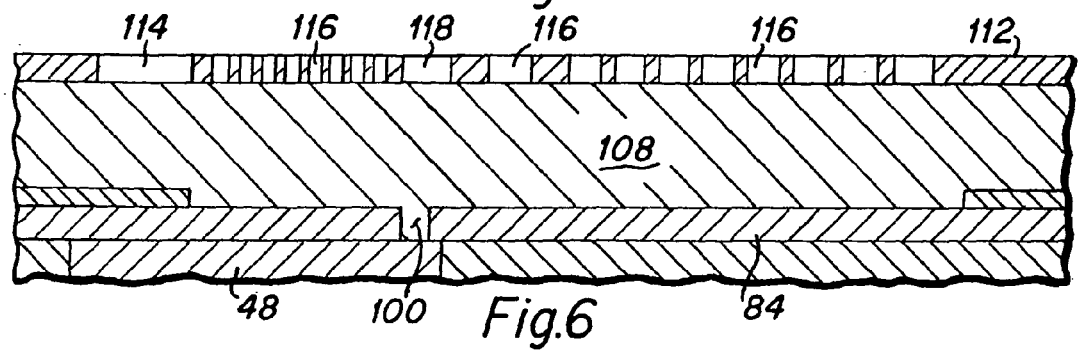

Thereafter, as depicted in FIG. 6, a patterned RIE etch mask 112 of the present invention is fabricated upon the dielectric layer 108. A significant feature of the present invention is that the RIE mask is patterned to include openings 114, 116 and 118 for the P2 pole tip trench configuration and the induction coil trench configuration, as well as the back gap piece, as is next described. For a fluorine RIE process a suitable etching mask 112 may be composed of a thin layer of NiFe or alumina, whereas for an oxygen RIE process the mask may be composed of $SiO_2$, $Ta_2O_5$, titanium, NiFe, alumina or other materials as are known to those skilled in the art.

Figure 7:
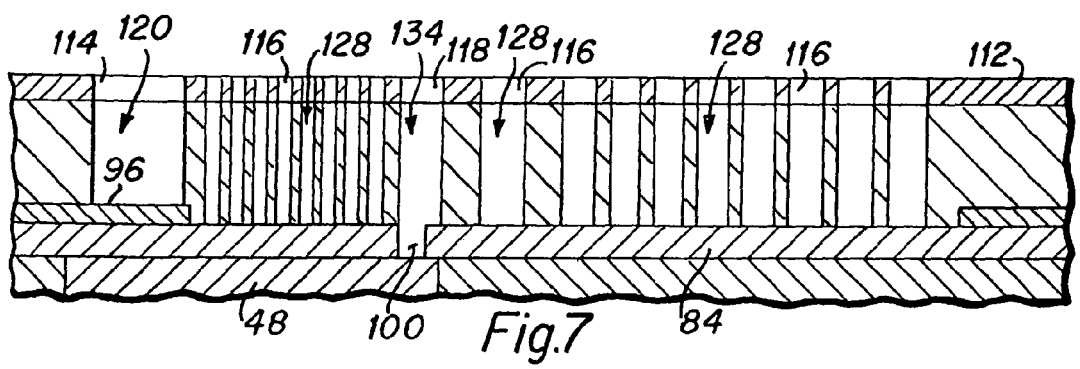
Figure 8:
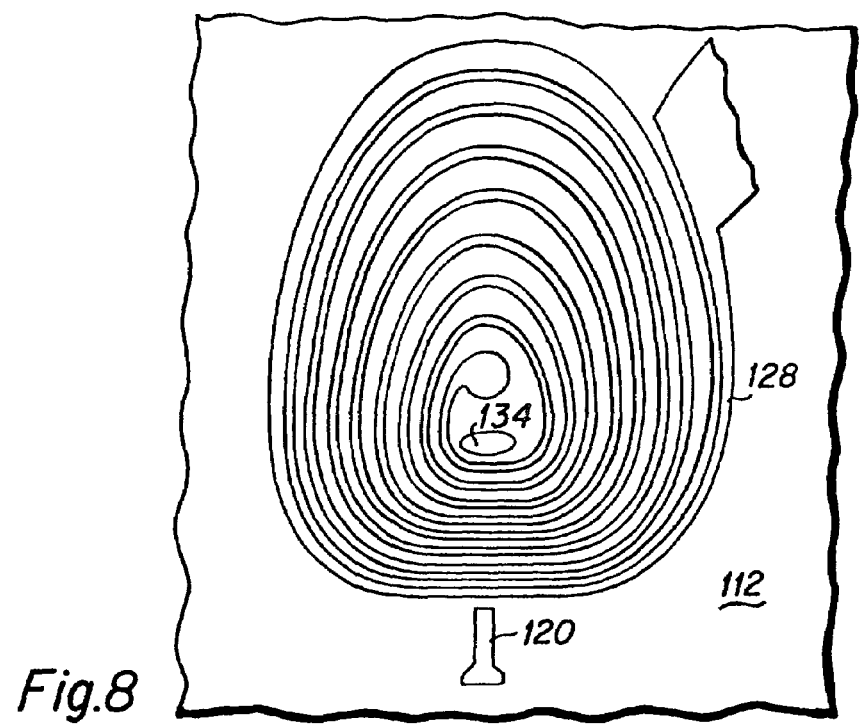
FIG. 8 is a top plan view depicting the P2 pole tip and induction coil trenches created in a fabrication step of the magnetic head of the present invention.

Following the fabrication of the patterned RIE mask 112, an RIE process step is conducted, in which trenches are etched through the mask openings into the dielectric material. FIG. 7 is a cross-sectional view of the trench pattern of the present invention, and FIG. 8 is a top plan view of the trench pattern depicted in FIG. 7. Therefore, as is depicted in FIGS. 7 and 8, the RIE trenches include the P2 pole tip trench 120 that is etched through opening 114 down to the patterned NiFe seed layer 96, the spiral induction coil trench 128 that is etched through opening 116 down to the write gap layer 84, and the back gap trench 134 that is etched through opening 118 down through the back gap hole 100 to the P1 pole surface 48. It is noteworthy that the RIE trenches 120, 128 and 134 all have essentially the same depth, that being the thickness of the dielectric layer 108.

Figure 9:
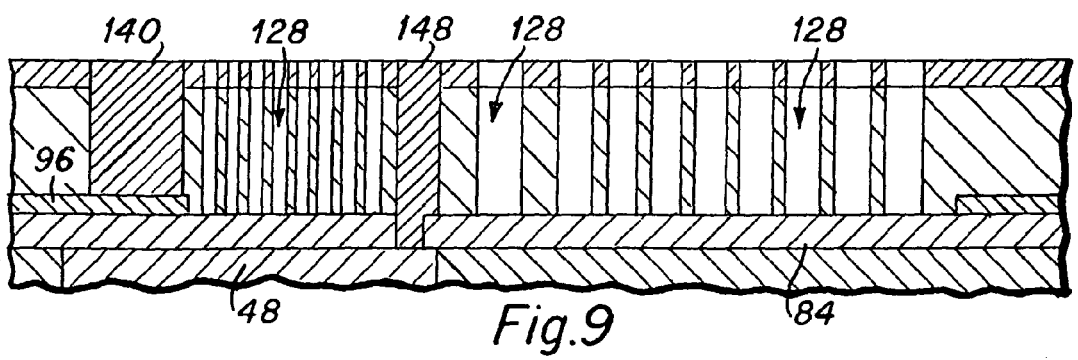
FIGS. 9–16 depict further fabrication steps of the magnetic head of the present invention.

An electroplating process for the P2 pole tip and back gap piece is next conducted. Specifically, as depicted in FIG. 9, an electrical potential is set up through the exposed seed layer 96 of the P2 pole tip, as well as the exposed P1 pole surface 48. The P2 pole tip 140 plates up into the P2 pole tip trench 120 and the back gap piece 148 simultaneously plates up into the back gap trench 134. Significantly, plating does not occur within the induction coil trenches 128 because there is no seed layer within the induction coil trenches to cause electroplating therewithin. The electroplating step of the P2 pole tip and back gap piece is conducted until the trenches are fully plated up.

Figure 10:
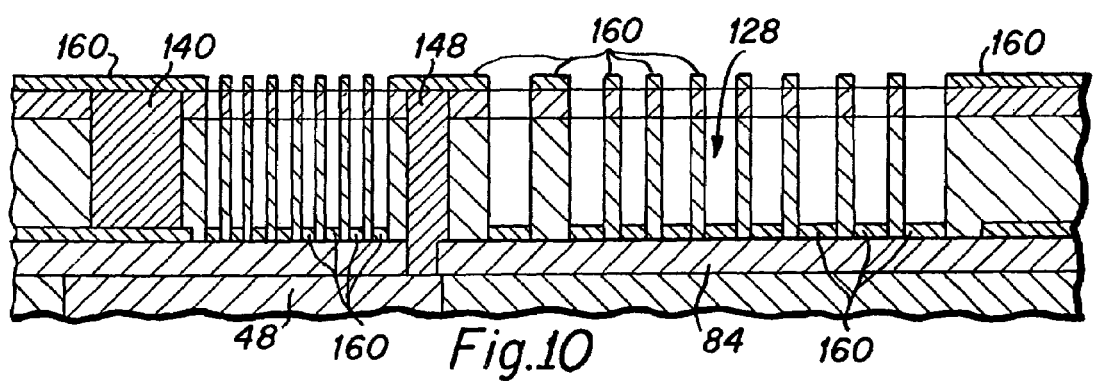
Figure 11:
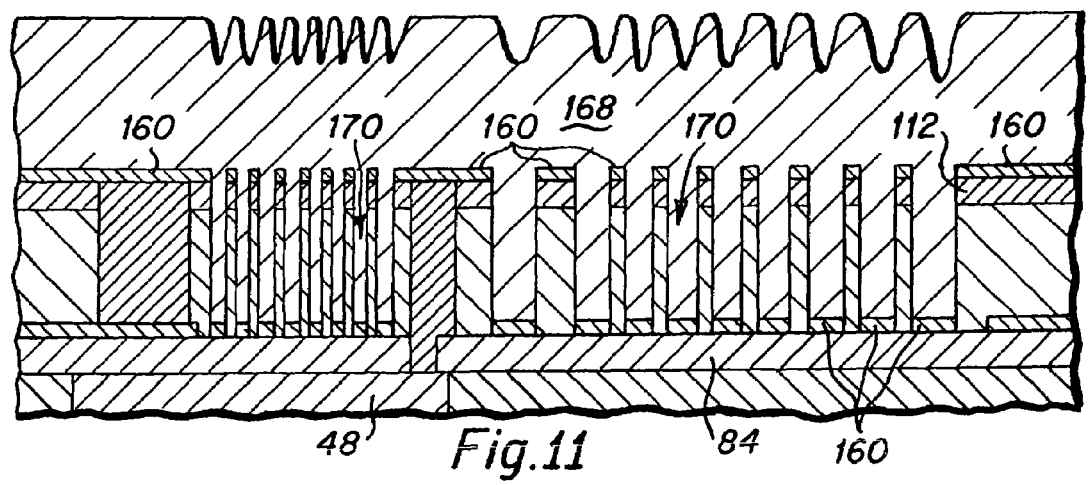
Figure 12:
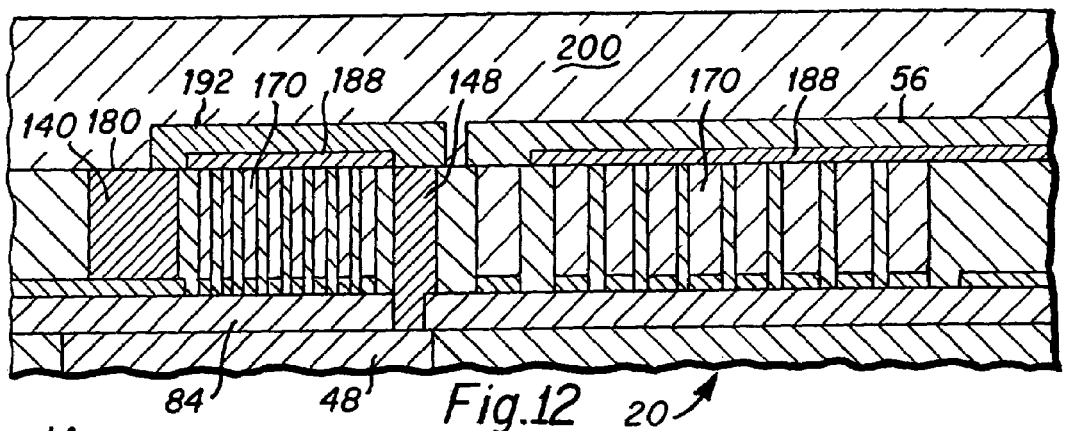

The fabrication of the copper induction coil is next commenced by the sputter deposition of a copper seed layer across the surface of the wafer. As depicted in FIG. 10, the copper seed layer 160 is deposited through the openings 116 into the induction coil trenches 128 as well as across the surface of the wafer, including the plated up P2 pole tip 140 and back gap piece 148. Thereafter, as depicted in FIG. 11, a copper electroplating process is conducted. A copper deposition 168 is formed upon the upper seed layer 160, and the copper seed layer 160 within the induction coil trenches 128 facilitates the electroplating of copper through the openings 116 into the trenches 128 to plate up the trenches and create the copper induction coil 170. Where sufficient electroplating power or other factors are of concern, the copper seed layer may be patterned such that the copper seed layer is only deposited in the necessary induction coil related areas. Thereafter, as depicted in FIG. 12, a chemical mechanical polishing (CMP) step is conducted to remove the excess copper 168 as well as the upper portions of the copper seed layer 160 and the RIE mask layer 112 to create a planar surface 180. As is further depicted in FIG. 12, a patterned electrical insulation layer 188 is thereafter deposited on top of the induction coil 170 to prevent coil shorting, and as is also depicted in FIG. 12, a patterned P2 yoke element 192 (sometimes referred to as a P3 pole) is fabricated on top of the insulation layer 188. The P2 yoke 192 is fabricated to make contact with both the P2 pole tip 140 and the back gap piece 148, such that magnetic flux will flow from the P2 yoke 192, through the back gap piece 148, through the P1 pole 48 and across the write gap layer 84 to the P2 pole tip 140 and to the P2 yoke 192. Thereafter, following further magnetic pole fabrication steps, including the fabrication of the induction coil electrical lead 56, as are known to those skilled in the art, an encapsulation layer 200 is deposited to complete the wafer level fabrication of the magnetic head 20 which is suitable for use in the disk drive 10.

Figure 13:
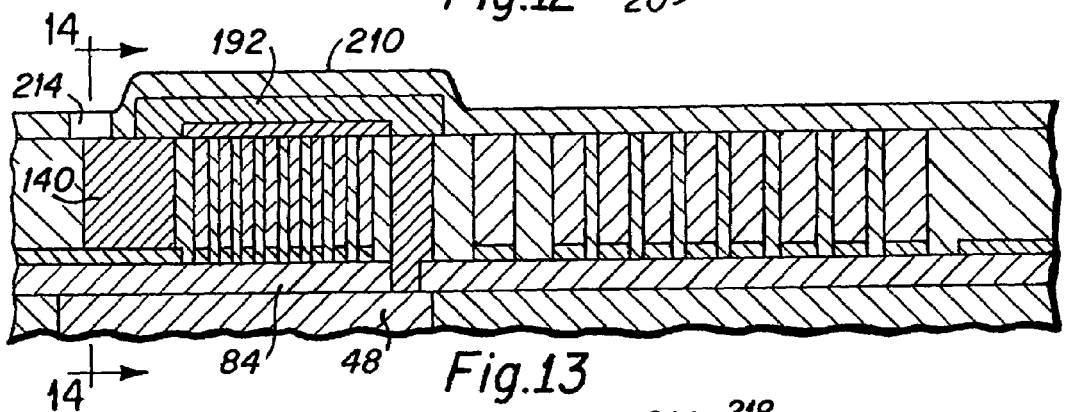
Figure 14:
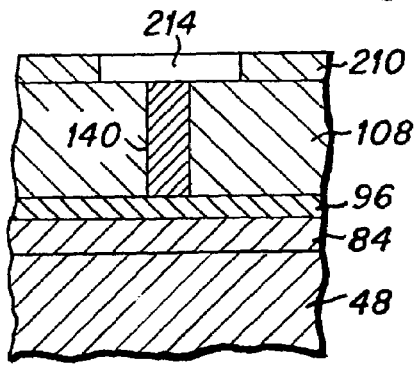
Figure 15:
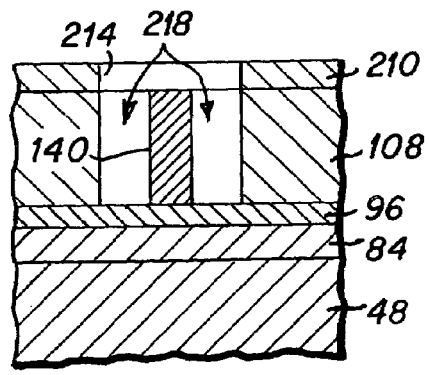
Figure 16:
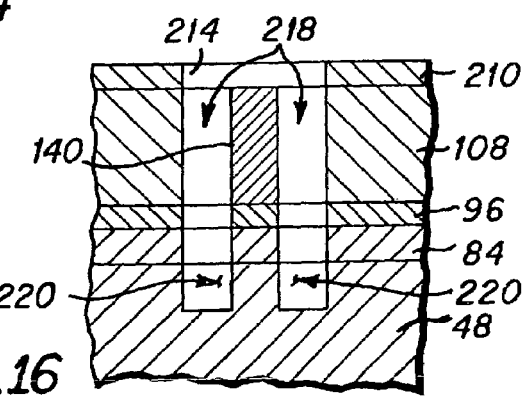

In the preferred embodiment of the present invention, a P1 pole notching step is conducted preferably following the fabrication of the P2 yoke and before encapsulation depicted in FIG. 12. Specifically, FIG. 13 depicts another patterned RIE etching mask 210 that is fabricated to include an opening 214 to expose the area around the P2 pole tip 140, and FIG. 14 is an end cross-sectional view of the head taken along lines 14—14 of FIG. 13. Another RIE etching process is then conducted, as depicted in FIG. 15, to create a trench 218 within the etchable dielectric material proximate the P2 pole tip 140. As is next depicted in FIG. 16, an ion milling process utilizing argon, or other ion milling species as are known to those skilled in the art, is conducted to remove portions of the NiFe seed layer 96, write gap layer 84 and a portion of the P1 pole 48 proximate the P2 pole tip 140, such that P1 pole notches 220 are achieved. Encapsulation of the notched head then follows, as is known to those skilled in the art.

It is therefore to be understood that a significant feature of the present invention is the utilization of a single RIE etching step to simultaneously create the P2 pole tip trench, the induction coil trench and the back gap trench. The prior deposition of the patterned P2 pole tip seed layer 96 allows for the separate electroplating of the P2 pole tip from the induction coil 170. Thereafter, a subsequent deposition of the copper seed layer into the preexisting induction coil trench facilitates the electroplating of the induction coil into the trench. The use of the single RIE process to simultaneously create both the P2 pole tip trench, the back gap trench and the induction coil trench saves time and expense in the magnetic head fabrication process. Additionally, fabrication difficulties which would result from depositing two or more separate RIE etchable dielectric layers for separate P2 pole tip and induction coil fabrication steps, as well as the difficulties of the alignment of the induction coils with the P2 magnetic pole tip and the back gap piece is avoided. The use of RIE process techniques facilitates the fabrication of fine pitched induction coils as well as narrower P2 pole tips than are typically accomplished utilizing photolithographic techniques in which high aspect ratio trenches for the P2 pole tip and the induction coil are difficult to reliably fabricate. A hard disk drive having a magnetic head of the present invention can be fabricated with increased areal data storage density due to the present invention's simplified fabrication of a narrower P2 pole tip, which creates narrower data tracks and leads to more tracks per inch written on the magnetic disk media of the hard disk drive. The high aspect ratio, fine pitch induction coil leads to increased data writing rates for the hard disk drive, as will be understood by those skilled in the art.

While the present invention has been shown and described with regard to certain preferred embodiments, it is to be understood that those skilled in the art will no doubt develop certain alterations and modifications in form and detail having read the preceding description. It is therefore intended that the following claims cover all such alterations and modifications that nevertheless include the true spirit and scope of the invention.

What is claimed is:

1. A magnetic head, comprising:
   a substrate;
   a read head being fabricated upon said substrate;
   a P1 pole being fabricated upon said read head;
   an insulation layer being fabricated upon said P1 pole;
   a P2 pole tip seed layer being fabricated upon portions of said insulation layer;
   a dielectric material layer being fabricated upon said P2 pole tip seed layer and upon said insulation layer;
   a P2 pole tip being fabricated upon said P2 pole tip seed layer and within said dielectric material layer;
   a back gap piece being fabricated within said dielectric material layer and in magnetic interconnection with said P1 pole;
   an induction coil seed layer being fabricated in part upon said insulation layer and in part upon portions of said dielectric material layer;
   an induction coil being fabricated upon said induction coil seed layer and within said dielectric material layer;
   a second insulation layer being fabricated upon said induction coil;
   a P2 pole yoke being fabricated upon said second insulation layer in magnetic interconnection with said P2 pole tip and with said back gap piece;
   an encapsulation layer being fabricated above said P2 pole yoke.

2. A magnetic head as described in claim 1 wherein said dielectric material layer includes a P2 pole tip trench, an induction coil trench and a back gap piece trench.

3. A magnetic head as described in claim 2 wherein said P2 pole tip trench, said induction coil trench and said back gap piece trench are formed in a single reactive ion etch fabrication step.

4. A magnetic head as described in claim 3 wherein a P1 pole notch is formed in said P1 pole proximate said P2 pole tip.

5. A magnetic head as described in claim 4 wherein a P1 pole notching trench is fabricated in said dielectric material layer in a second reactive ion etch fabrication step.

6. A hard disk drive comprising:
   at least one hard disk being fabricated for rotary motion upon a disk drive;
   at least one magnetic head adapted to fly over said hard disk for writing data on said hard disk, said magnetic head including:
   a substrate;
   a read head being fabricated upon said substrate;
   a P1 pole being fabricated upon said read head;
   an insulation layer being fabricated upon said P1 pole;
   a P2 pole tip seed layer being fabricated upon portions of said insulation layer;
   a dielectric material layer being fabricated upon said P2 pole tip seed layer and upon said insulation layer;
   a P2 pole tip being fabricated upon said P2 pole tip seed layer and within said dielectric material layer;
   a back gap piece being fabricated within said dielectric material layer and in magnetic interconnection with said P1 pole;
   an induction coil seed layer being fabricated in part upon said insulation layer and in part upon portions of said dielectric material layer;
   an induction coil being fabricated upon said induction coil seed layer and within said dielectric material layer;
   a second insulation layer being fabricated upon said induction coil;
   a P2 pole yoke being fabricated upon said second insulation layer in magnetic interconnection with said P2 pole tip and with said back gap piece;
   an encapsulation layer being fabricated above said P2 pole yoke.

7. A hard disk drive as described in claim 6 wherein said dielectric material layer includes a P2 pole tip trench, an induction coil trench and a back gap piece trench.

8. A hard disk drive as described in claim 7 wherein said P2 pole tip trench, said induction coil trench and said back gap trench are formed in a single reactive ion etch fabrication step.

9. A hard disk drive as described in claim 8 wherein a P1 pole notch is formed in said P1 pole proximate said P2 pole tip.

* * * * *